United States Patent [19]
Ohya

[11] Patent Number: 5,083,832
[45] Date of Patent: Jan. 28, 1992

[54] STRUCTURE OF VEHICLE DOOR

[75] Inventor: Takeji Ohya, Hiroshima, Japan

[73] Assignee: Mazda Motor Corporation, HIroshima, Japan

[21] Appl. No.: 551,170

[22] Filed: Jul. 11, 1990

[30] Foreign Application Priority Data

Jul. 12, 1989 [JP] Japan ............... 1-179425

[51] Int. Cl.$^5$ .................................. B60J 5/04
[52] U.S. Cl. ........................ 296/146; 296/201; 296/154; 49/502; 248/475.1
[58] Field of Search ............... 296/146, 201, 152, 154, 296/185; 49/374, 502; 248/475.1

[56] References Cited

U.S. PATENT DOCUMENTS

| | | | |
|---|---|---|---|
| 3,583,757 | 6/1971 | Wilfert et al. | 296/154 X |
| 4,034,509 | 7/1977 | DeRees | 49/374 X |
| 4,473,252 | 9/1984 | Tomford et al. | 49/502 X |
| 4,709,957 | 12/1987 | Ohya | 49/374 X |
| 4,800,681 | 1/1989 | Skillen et al. | 49/502 X |

FOREIGN PATENT DOCUMENTS

| | | | |
|---|---|---|---|
| 2551826 | 3/1985 | France | 296/154 |
| 0113515 | 5/1986 | Japan | 49/502 |
| 0135825 | 6/1986 | Japan | 296/201 |
| 62-52119 | 11/1987 | Japan | |
| 0031818 | 2/1988 | Japan | 49/502 |
| 63-160211 | 10/1988 | Japan | |

*Primary Examiner*—Dennis H. Pedder
*Attorney, Agent, or Firm*—Sixbey, Friedman, Leedom & Ferguson

[57] ABSTRACT

A door body is formed of outer and inner panels, and a door windowpane is supported by the door body. The door windowpane includes a stationary windowpane which is fixed to the door body and a movable windowpane which is movable up and down relative to the stationary windowpane to close and open an opening defined by the stationary windowpane. The upper edge portion of the outer panel supports the door windowpane from the inside at the part opposed to the stationary windowpane and from the outside at the part opposed to the movable windowpane. The part of the upper edge portion opposed to the stationary windowpane is connected to the inner panel to form a closed cross-section, and the part of the upper edge portion opposed to the movable windowpane is connected to a reinforcement to form a closed cross-section.

20 Claims, 7 Drawing Sheets

STRUCTURE OF VEHICLE DOOR

BACKGROUND OF THE INVENTION

1. Field of the Invention

This invention relates to a structure of a vehicle door in which the windowpane (stationary windowpane, movable windowpane) is positioned outside the door frame.

2. Description of the Prior Art

There has been known a module type windowpane which has a lace member integrally molded on the periphery thereof and is mounted on the vehicle body to close an opening in the body panel. (For example, see Japanese Unexamined Utility Model Publication 63(1988)-160211.)

Further, there has been known a vehicle door structure which comprises a stationary windowpane mounted on the upper portion of the door body and a movable windowpane which is mounted for up-and-down motion in a cutaway portion formed in the stationary windowpane. (For example, see Japanese Patent Publication No. 62(1987)-52119.)

An attempt to make such a vehicle door structure comprising a stationary windowpane and a movable windowpane by utilizing the module type windowpane will encounter the following difficulties.

That is, it is difficult to obtain a predetermined supporting strength since both the stationary windowpane portion and the movable windowpane portion exist in such a structure. Especially, when the door windowpane is on the outside of the door frame, the structure must be arranged so as to permit up-and-down motion of the movable windowpane while ensuring a sufficient stiffness.

SUMMARY OF THE INVENTION

In view of the foregoing observations and description, the primary object of the present invention is to provide a vehicle door structure which comprises a stationary windowpane of a module type and a movable windowpane and can provide an increased stiffness to the windowpane portion.

In accordance with the present invention, there is provided a vehicle door structure comprising a door body which is formed of outer and inner panels, and a door windowpane which is supported by the door body and includes a stationary windowpane which is fixed to the door body and a movable windowpane which is movable up and down relative to the stationary windowpane to close and open an opening defined by the stationary windowpane, characterized in that the upper edge portion of the outer panel supports the door windowpane from the inside at the part opposed to the stationary windowpane and from the outside at the part opposed to the movable windowpane, the part of the upper edge portion opposed to the stationary windowpane being connected t the inner panel to form a closed cross-section, and the part of the upper edge portion opposed to the movable windowpane being connected to a reinforcement to form a closed cross-section.

DESCRIPTION OF THE PREFERRED EMBODIMENT

Figure 1:
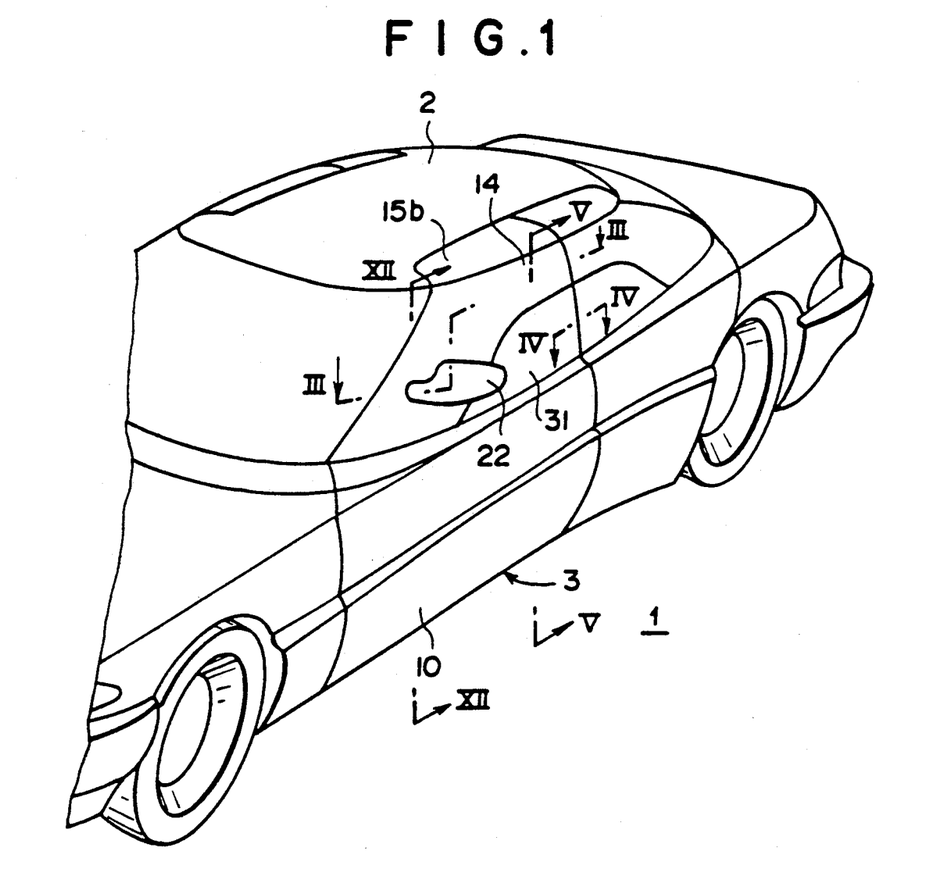
FIG. 1 is a fragmentary perspective view showing a vehicle provided with a vehicle door structure in accordance with an embodiment of the present invention.

In FIG. 1, a vehicle 1 has a body 2 which is provided with an opening on each side thereof, and a door 3 is mounted in the opening.

Figure 2:
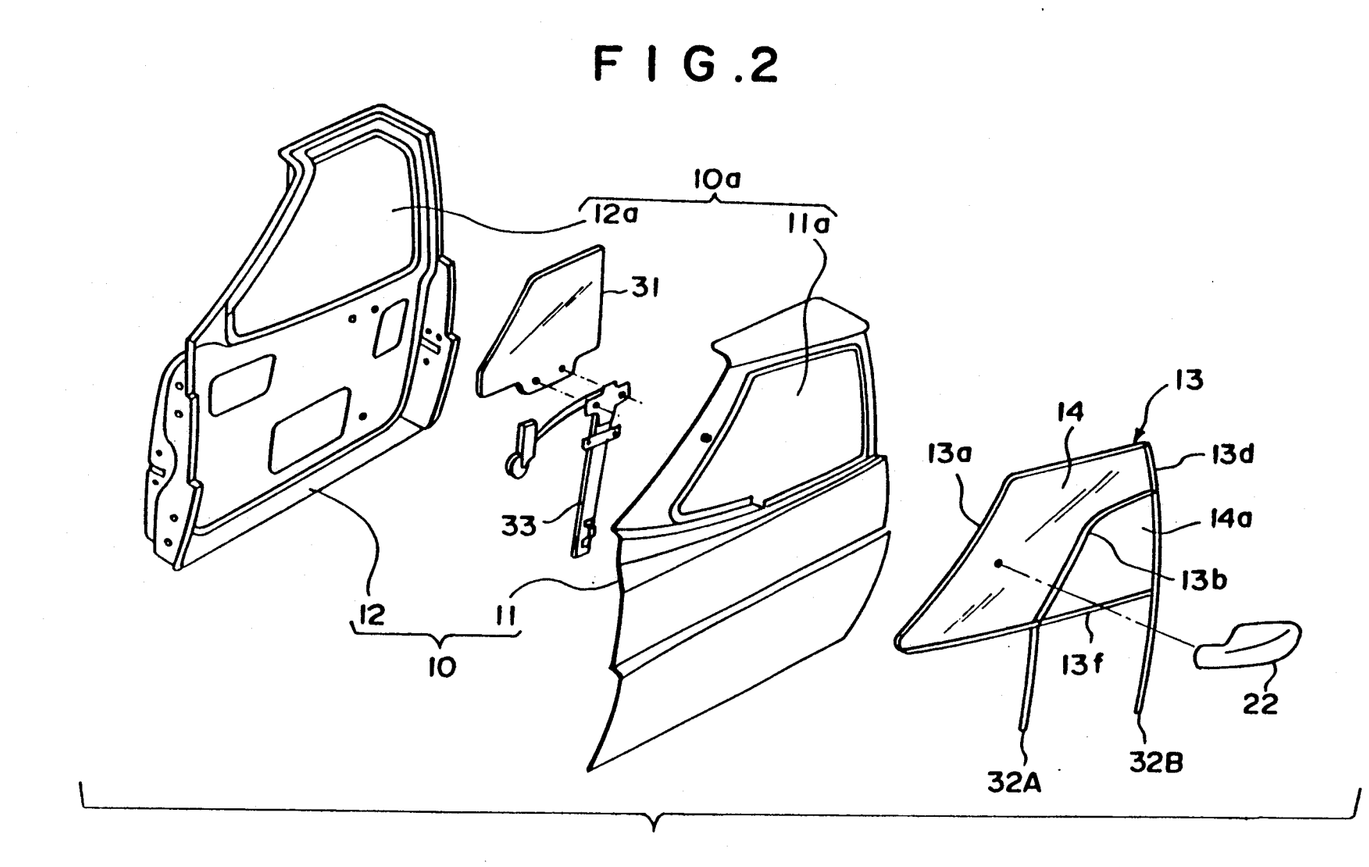
FIG. 2 is an exploded perspective view of the door structure.

As shown in FIG. 2, the door 3 is formed of outer and inner panels 11 and 12 which are welded together. The outer and inner panels 11 and 12 are respectively provided with openings 11a and 12a in their upper portions and when the outer and inner panels 11 and 12 are welded together, the door 3 having a door body portion 10 and a door frame portion 15 which defines a door window 3a is formed. The door frame portion 15 has a closed cross-section, and a module type stationary windowpane 14 is mounted on the outer side of the door frame portion 15. The module type stationary windowpane 14 has a lace member 13 integrally molded on the periphery thereof. That is, the door 3 is of a so-called inner frame structure in which the door frame portion 15 is inside the stationary windowpane 14.

The stationary windowpane 14 is provided with an opening 14a for a movable windowpane 31 to be described later.

The entire peripheries of the outer and inner panels 11 and 12 are hemmed and welded and the welded portion 15a around the door window 3a forms a flange directed outward. This provides an open feeling and welding of the outer and inner panels 11 and 12 is facilitated, and at the same time, an inner garnish 23 which is to be mounted on the welded portion 15a can be mounted in the direction in which it is pressed against the stationary windowpane 14, which facilitates mounting of the inner garnish 23 and prevents the inner garnish 23 from slipping from the welded portion 15a.

The lace member 13 comprises a peripheral lace portion 13a on the outer periphery of the stationary windowpane 14, a first guide lace portion 13b which is provided on the periphery of defining the opening 14a and functions as a guide for guiding the up-and-down motion of the movable windowpane 31, and a second guide lace portion 13d which is provided on the rear edge of the stationary windowpane 14 and has a guide groove 13c for guiding the movable windowpane 31 in the lower portion thereof. The lace member 13 is bonded to the outer panel 11 by adhesive S, whereby large stiffness can be obtained even if the cross-sectional area of the door frame portion 15 is small.

A protrusion portion 13e is formed on the front edge portion of the peripheral lace portion 13a of the lace member 13. The protrusion portion 13e prevents air which flows along the surface of the vehicle body (e.g., the hood) and impinges upon the protrusion portion 13e from flowing toward the side surface of the vehicle body and causes the air to flow toward the roof, thereby improving aerodynamic properties.

Figure 3:
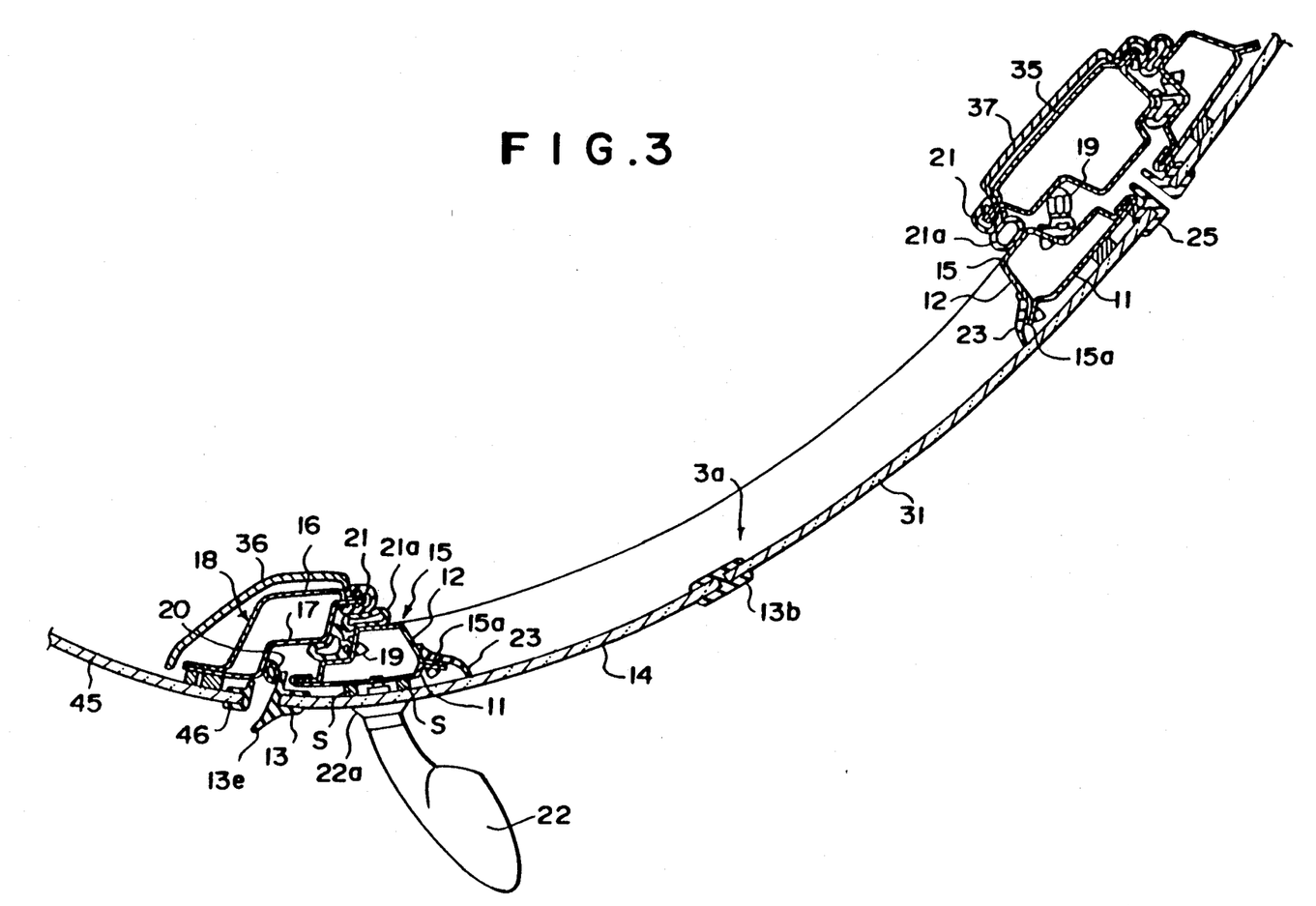
FIGS. 3 to 5 are cross-sectional views respectively taken along line III—III, IV—IV and V—V in FIG. 1.

A main seal rubber 19 is mounted on the inner panel 12 at the door frame portion 15 and is in resilient contact with a front pillar 18 which is formed of a pillar inner 16 and a pillar outer 17 and has a closed cross-section.

An outer seal rubber 20 is provided on the lace member 13 and is in resilient contact with the front pillar 18 at a portion on the outer side of the portion at which the main seal rubber 19 contacts with the front pillar 18. A seaming welt 21 is fitted on the welded portion 15a behind the front pillar 18, and the seaming welt 21 has a seal portion 21a which is in resilient contact with the inner panel 12 at the door frame portion 15.

At the front lower portion of the stationary windowpane 14, the base portion 22a of a door mirror 22 is fixed to the outer panel 11 with the stationary windowpane 14 intervening therebetween.

Though not shown in detail, the upper portion 15b of the door frame portion 15 hangs over and covers a closed cross-section roof rail portion on the side of the roof portion of the vehicle body 2.

Said opening 14a is formed by cutting the rear lower portion of the stationary windowpane 14, and the movable windowpane 31 is received in the opening to be movable up and down. A pair of guide rails 32A and 32B are fixedly mounted on the lace member 13 respectively at the front and rear edge of the opening 14a, and the movable windowpane 31 is moved up and down along the guide rails 32A and 32B by a window regulator 33.

Figure 4:
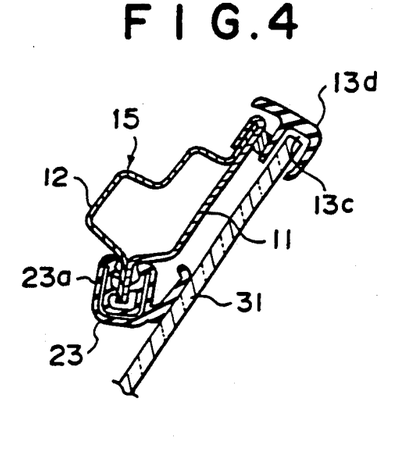

A main seal rubber 19 fixed to the door frame portion 15 at the rear end portion of the stationary windowpane 14 is in contact with a center pillar 35, and the seal portion 21a of a seaming welt 21 fitted on the front edge portion of the center pillar 35 is in contact with a door frame portion 15. Reference numerals 36 and 37 respectively denote pillar trims for the front pillar 18 and the center pillar 35.

As shown in FIG. 4, a reinforcement 23a is embedded in the inner garnish 23 at the lower portion opposed to the movable windowpane 31.

Figure 6:
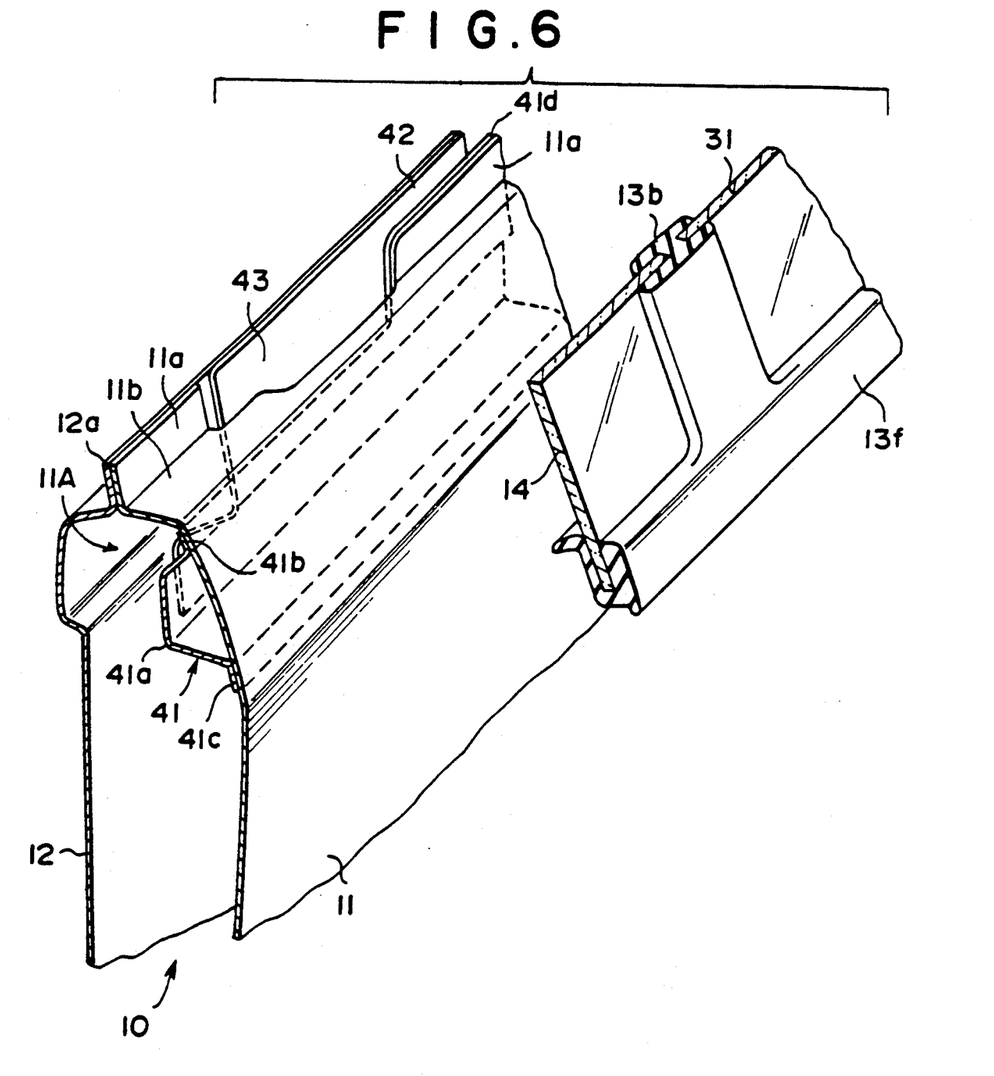
FIG. 6 is a perspective view showing the upper part of the door body with the lace member removed.
Figure 7:
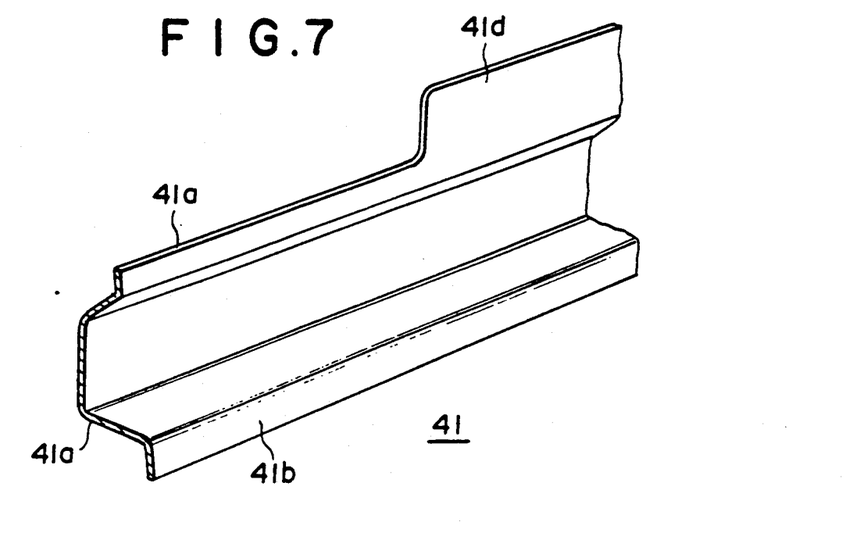
FIG. 7 is a perspective view of the outer panel reinforcement.

As shown in FIG. 6, the part of the outer panel 11 which forms the door body portion 10 of the door 3 to which the stationary windowpane 14 is bonded has an upper flange portion 11a and the upper flange portion 11a is welded to an upper flange portion 12a of the inner panel 12. An outer panel reinforcement 41 (FIG. 7) is welded to the inner side of the outer panel 11. That is, the outer panel reinforcement 41 is like a hat in cross-section, and comprises a main body portion 41a and upper and lower flange portions 41b and 41c which are welded the inner side of the outer panel 11.

Figure 12:
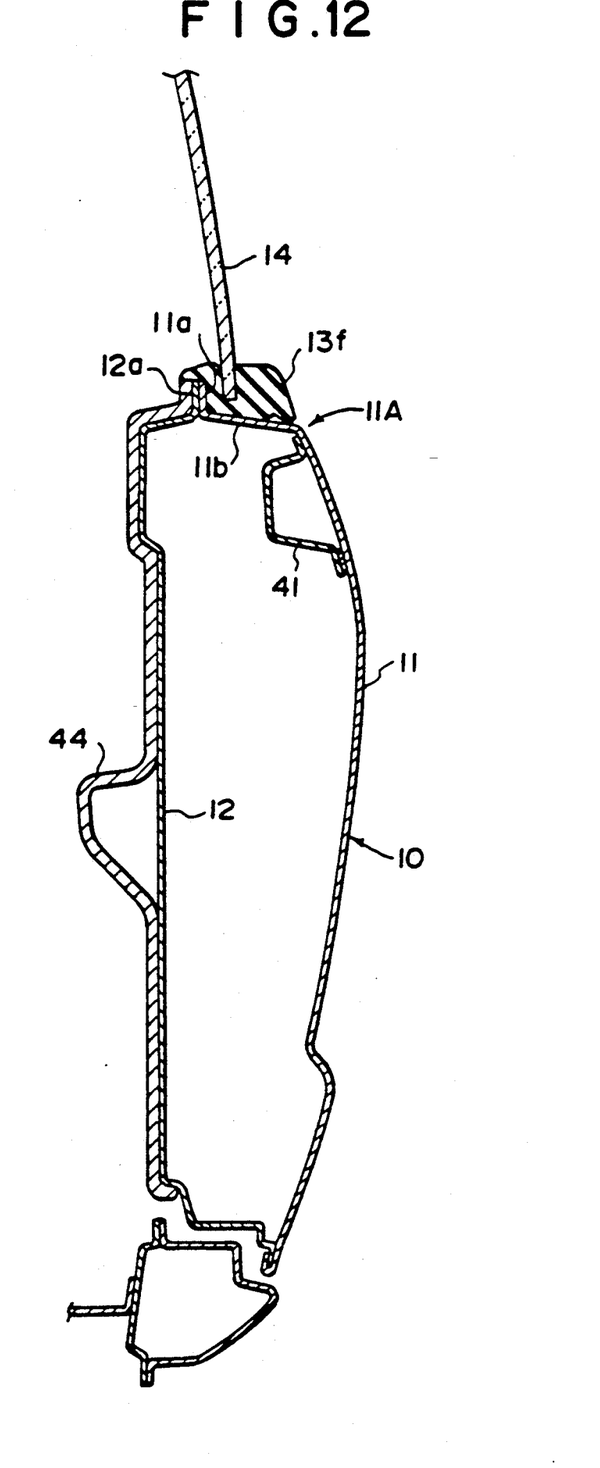
FIG. 12 is a sectional view taken on section XII—XII in FIG. 1.

As shown in FIG. 12, a part of an upper edge portion 11A of the outer panel 11 opposed to the stationary windowpane 14 is bent inward to form a shoulder portion 11b and the stationary windowpane 14 rests on the shoulder portion 11b. A beltline lace portion 13f of the lace member 13 is interposed between the stationary windowpane 14 and the shoulder portion 11b.

Figure 5:
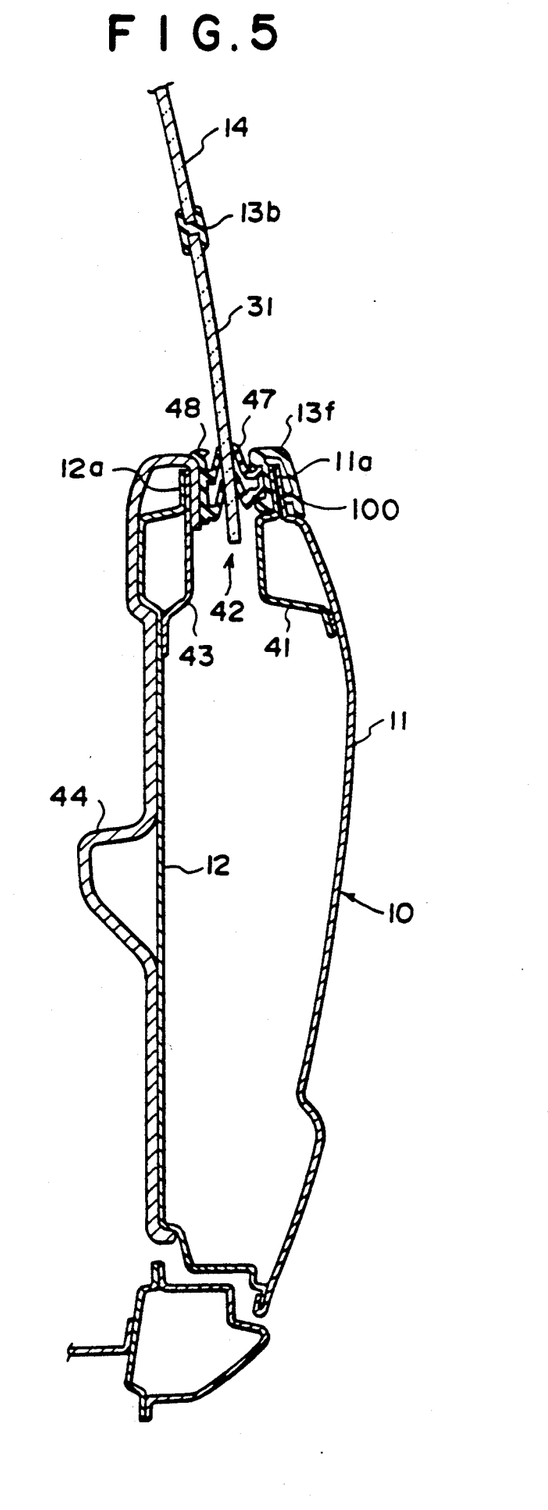

At the part of the door body portion 10 opposed to the movable window pane 31, the upper flange portions 11a and 12a of the outer and inner panels 11 and 12 are apart from each other as shown in FIG. 5 to define an opening 42 through which the movable windowpane 31 is retracted in the door body portion 10, and at the same time, the outer panel reinforcement 41 and an inner panel reinforcement 43 welded to the outer and inner panels 11 and 12 reinforce the respective panels 11 and 12. A part of the upper flange portion 11a of the outer panel 11 is cut away since the upper edge of the outer panel 11 is displaced outward, and to the rear portion of the upper flange portion 11a is welded (as shown at 100) an extension 41d of the outer panel reinforcement 41, the extension 41d being vertically elongated.

A door trim 44 extending from the front is mounted on the upper flange portion 12a of the inner panel 12. The beltline lace portion 13f having an opening through which the movable windowpane 31 is moved up and down is mounted on the upper flange portion 11a of the outer panel 11. A weatherstrip outer 47 is mounted on the beltline lace portion 13f, and a weatherstrip inner 48 is mounted on the upper end portion of the door trim 44.

Reference numerals 45 and 46 denote a windshield and a lace member which is integrally molded on the periphery of the windshield 45.

With the arrangement described above, the outer panel 11 is provided with a sufficient stiffness since the upper flange portion 11a is welded to the upper flange portion 12a of the inner panel 12 to form a closed cross-section at the front portion at which the lower edge portion of the stationary windowpane 14 is bonded to the outer panel 11 and at the same time, the upper flange portion 11a is welded to the outer panel reinforcement 41 to form a closed cross-section at the rear portion at which the movable windowpane 31 is disposed.

Since the part on which the stationary windowpane 14 is mounted and the part on which the movable windowpane 31 is mounted are formed by changing the position of the outer panel 11 relative to the inner panel 12 with the positions of the inner panel 12 in the vertical direction and the transverse direction of the vehicle body fixed over the entire length of the inner panel 11, the upper flange portion 12a of the inner panel 12 can be used as the reference for determining the vertical and transverse positions of the door trim 44. Especially, since the stationary windowpane 14 can be incorporated by operations in one direction, the space and the difference in height between the stationary windowpane 14 and the parts associated therewith can be accurately controlled.

As can be seen from FIG. 1, the movable windowpane 31 is disposed in the rear lower portion of the stationary windowpane 14 in the front door and is disposed in the front lower portion of the stationary windowpane 14 in the rear door. The movable windowpane 31 has a large curvature. Further the door frame portion 15 hangs over the roof rail portion as described above. These features highly contribute to improvement in integrality of the door windowpane with the three-dimensional curved surface formed by the windshield and the rear windowpane, and improvement in the aerodynamic properties of the vehicle body. Though the vehicle becomes of a tambour form, the passengers can easily get on and off since the stationary windowpane 14 hangs over the roof rail portion. Further since the stationary windowpane 14 is bonded to the door frame portion 15, the stiffness of the door frame portion 15 is increased, the effect of which especially great since the door frame portion 15 corresponds to the portion where the high-speed vacuum phenomenon occurs.

Further since the door mirror 22 is mounted on the door frame portion 15, the driver need not largely move his line of vision, and the arrangement where the door mirror 22 projects from the stationary windowpane 14 provides integrality to the appearance of the vehicle body. Further since the door mirror 22 is in contact with both the surface of the stationary windowpane 14 and the surface of the outer panel 11, sealing effect is improved. Further, since the mounting portion of the door mirror 22 is between the dam of the adhesive S and the inner garnish 23, even if water penetrates into the space between the stationary windowpane 14 and the outer panel 11, the water cannot penetrate into the passenger room. Further, in the case where the door mirror 22 is a remote control mirror, the harness for driving the mirror can be provided between the outer panel 11 and the stationary windowpane 14.

Figure 8:
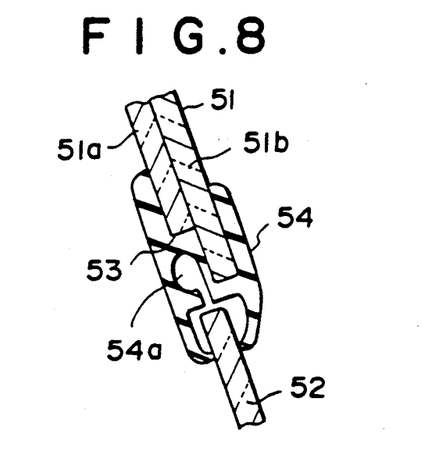
FIGS. 8 to 11 are fragmentary views illustrating modifications of the embodiment.

The stationary windowpane 14 may be of laminated glass. In such a case, it is preferred that one ply 51a (FIG. 8) of the laminated glass 51 be shorter than the other ply 51b so that a stepped portion is formed on the end of the stationary windowpane 14 opposed to the movable windowpane 52 and a hollow portion 54a be formed in the lace member 54 at the stepped portion 53, which contributes to improvement of elasticity of the lace member 54.

Figure 9:
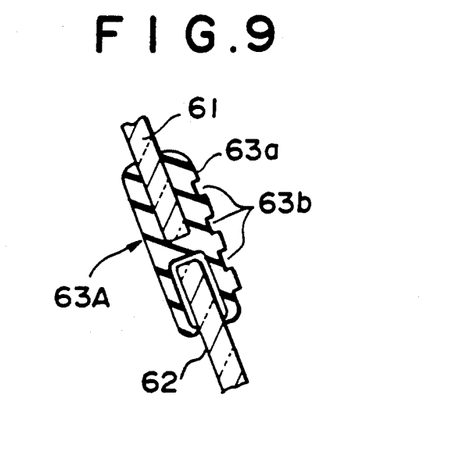
Figure 10:
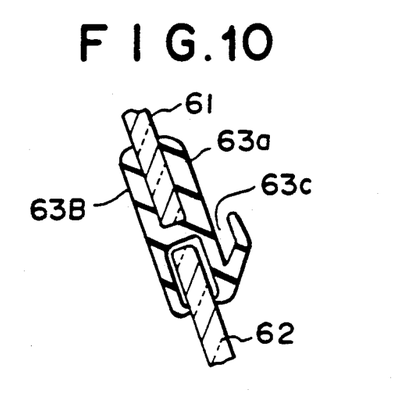
Figure 11:
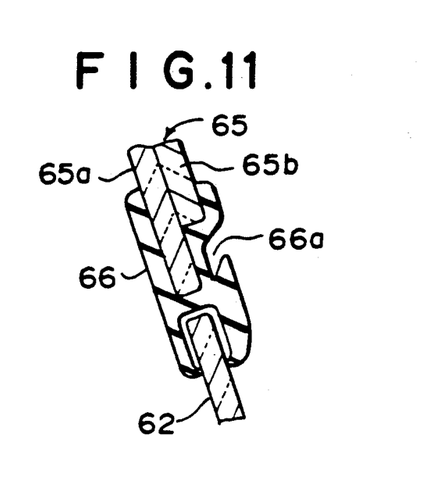

Further, as shown in FIG. 9, recesses 63b may be formed on the outer surface of the guide lace portion 63a of the lace member 63 between the stationary windowpane 61 and the movable windowpane 62 in order to prevent droplets of water on the stationary windowpane 61 from falling into the passenger room. A protrusion 63c which is substantially L-shaped in cross-section may be formed on the guide lace portion 63a instead of the recesses 63b as shown in FIG. 9. When the stationary windowpane 65 is formed of laminated glass, it is preferred that outer ply 65b (FIG. 11) of the laminated glass 65 be shorter than the inner ply 65a so that a stepped portion is formed on the end of the stationary windowpane 65 opposed to the movable windowpane 62 and a recess 66a be formed in the lace member 66 at the stepped portion.

I claim:

1. A vehicle door structure comprising a door body which is formed of outer and inner panels, and a door windowpane which is supported by the door body and includes a stationary windowpane which is fixed to the door body and a movable windowpane which is movable up and down relative to the stationary windowpane to close and open an opening defined by the stationary windowpane, wherein an upper edge portion of the outer panel supports the door windowpane from the inside at a part opposed to the stationary windowpane and slidably supports the door windowpane from the outside at a part opposed to the movable windowpane so as to guide the movable windowpane in its up-and-down motion, the part of the upper edge portion opposed to the stationary windowpane being connected to the inner panel to form a closed cross-section, and the part of the upper edge portion opposed to the movable windowpane being connected to a reinforcement to form a closed cross-section wherein said reinforcement extends along a lengthwise direction of said door and includes a first portion connected to the part of the upper edge portion of the outer panel opposed to the movable windowpane whereby the movable windowpane is guided in its up-and-down movement between the inner panel and a connection between the reinforcement and the outer panel, said reinforcement further including a second portion connected to the outer panel at a position longitudinally aligned with and below the connection between the inner panel and the part of the upper edge portion of the outer panel opposed to the stationary windowpane.

2. A vehicle door structure as defined in claim 1 in which said door body has a frame portion which projects upward therefrom, and said stationary windowpane is bonded to the outer side of the frame portion.

3. A vehicle door structure as defined in claim 2 in which the part of said upper edge portion of the outer panel opposed to the stationary windowpane is bent inward to form a shoulder portion and the stationary windowpane is supported by the shoulder portion.

4. A vehicle door structure as defined in claim 3 in which said upper edge portion of the outer panel is apart from the inner panel and the movable windowpane is retracted into the door body through the space between the inner panel and the outer panel when it is moved downward.

5. A vehicle door structure as defined in claim 4 in which a beltline lace member is mounted on said upper edge portion of the outer panel and extends across the stationary windowpane and the movable windowpane.

6. A vehicle door structure as defined in claim 3 in which said movable windowpane is positioned in the rear lower portion of the door windowpane.

7. A vehicle door structure as defined in claim 2 in which a door mirror is fixed to the frame portion with the stationary windowpane intervening therebetween.

8. A vehicle door structure as defined in claim 2 in which a guide lace member which guides the movable windowpane during its up-and-down motion is mounted on the stationary windowpane along the boundary between the stationary windowpane and the movable windowpane.

9. A vehicle door structure as defined in claim 8 in which a plurality of recesses are formed on the outer side of the guide lace member and extend along the boundary between the stationary windowpane and the movable windowpane.

10. A vehicle door structure as defined in claim 8 in which said guide lace member is provided along the boundary between the stationary windowpane and the movable windowpane with a protrusion which projects outward and is bent away from the movable windowpane.

11. A vehicle door structure as defined in claim 1 in which said door body has a frame portion which projects upward therefrom, and said stationary windowpane is bonded to the outer side of the frame portion.

12. A vehicle door structure as defined in claim 1 in which the part of said upper edge portion of the outer panel opposed to the stationary windowpane is bent inward to form a shoulder portion and the stationary windowpane is supported by the shoulder portion.

13. A vehicle door structure as defined in claim 1 in which a beltline lace member is mounted on said upper edge portion of the outer panel and extends across the stationary windowpane and the movable windowpane.

14. A vehicle door structure as defined in claim 12 in which said movable windowpane is positioned in the rear lower portion of the door windowpane.

15. A vehicle door structure as defined in claim 11 in which a guide lace member which guides the movable windowpane during its up-and-down motion is mounted on the stationary windowpane along the boundary between the stationary windowpane and the movable windowpane.

16. A vehicle door structure as defined in claim 15 in which a plurality of recesses are formed on the outer side of the guide lace member and extend along the boundary between the stationary windowpane and the movable windowpane.

17. A vehicle door structure as defined in claim 15 in which said guide lace member is provided along the boundary between the stationary windowpane and the movable windowpane with a protrusion which projects outward and is bent away from the movable windowpane.

18. A vehicle door structure as defined in claim 1 in which the reinforcement is like a hat in cross-section, and comprises a main body portion and upper and lower flange portions which are secured to the inner side of the outer panel.

19. A vehicle door structure as claimed in claim 18 in which the reinforcement further comprises an extension portion which is vertically elongated from the upper flange portion at the part opposed to the movable windowpane so that the extension portion is welded with a flange portion of the upper edge portion opposed to the movable windowpane.

20. A vehicle door structure as defined in claim 19 in which a part of said upper edge portion is cut away so that said flange portion of the upper edge portion can be displaced outward.

* * * * *